(12) United States Patent
Weiss

(10) Patent No.: US 11,713,586 B2
(45) Date of Patent: Aug. 1, 2023

(54) TOOL ARRANGEMENT FOR PIVOTING A TOWER OR A TOWER SEGMENT FROM A NON-ERECTED POSITION TO AN ERECTED POSITION

(71) Applicant: Siemens Gamesa Renewable Energy A/S, Brande (DK)

(72) Inventor: Christopher Weiss, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/606,805

(22) PCT Filed: Mar. 27, 2020

(86) PCT No.: PCT/EP2020/058685
§ 371 (c)(1),
(2) Date: Oct. 27, 2021

(87) PCT Pub. No.: WO2020/224868
PCT Pub. Date: Nov. 12, 2020

(65) Prior Publication Data
US 2022/0205269 A1    Jun. 30, 2022

(30) Foreign Application Priority Data
May 6, 2019 (EP) .................................... 19172753

(51) Int. Cl.
*E04H 12/34* (2006.01)
*F03D 13/10* (2016.01)

(52) U.S. Cl.
CPC ........... *E04H 12/345* (2013.01); *F03D 13/10* (2016.05)

(58) Field of Classification Search
CPC ...... F03D 13/10; F03D 13/40; F05B 2230/61; Y02P 70/50; E04H 12/345
See application file for complete search history.

(56) References Cited

U.S. PATENT DOCUMENTS 3,638,375 A  *  2/1972  Vasiliev ................. E04H 12/34
                                                  52/745.18
4,079,559 A     3/1978  Tenbrummeler
(Continued)

FOREIGN PATENT DOCUMENTS

CN        101599619 A      12/2009
CN        104555734 A       4/2015
(Continued)

OTHER PUBLICATIONS

European Search report dated Oct. 30, 2019 for application No. 19172753.6.
(Continued)

*Primary Examiner* — Babajide A Demuren
(74) *Attorney, Agent, or Firm* — Schmeiser, Olsen & Watts LLP

(57) ABSTRACT

Provided is a tool arrangement for pivoting a tower or a tower segment from a non-erected position to an erected position, including a bottom tool device with a first device section with an attachment to removably attach the first device section to a bottom mounting section, and with a second device section adapted to be arranged on the ground and being attachable or attached to the first device section, wherein the bottom tool device includes a pivot axis at least when the first and the second device sections are attached to each other, wherein the tower or the tower segment, when fixed to the bottom tool device, is pivotable around the pivot axis when being erected, wherein, when the tower or the tower segment is fixed to the bottom tool device, the pivot axis is perpendicular to the longitudinal axis of the tower or the tower segment.

16 Claims, 13 Drawing Sheets

(56) References Cited

U.S. PATENT DOCUMENTS

| | | | |
|---|---|---|---|
| 4,127,199 A | | 11/1978 | Clethero |
| 4,451,198 A | * | 5/1984 | Sanderson .............. B21C 47/28 |
| | | | 414/908 |
| 4,903,442 A | | 2/1990 | Trommen |
| 8,657,549 B2 | * | 2/2014 | Grubb .................... G21C 19/07 |
| | | | 414/404 |
| 2007/0114799 A1 | | 5/2007 | Riesberg et al. |
| 2015/0048043 A1 | * | 2/2015 | Laurens ................. F03D 13/10 |
| | | | 212/270 |

FOREIGN PATENT DOCUMENTS

| | | |
|---|---|---|
| CN | 106744312 A | 5/2017 |
| CN | 109667721 A | 4/2019 |
| DE | 3731931 A1 | 4/1989 |
| EP | 1811171 A2 | 7/2007 |
| EP | 1873332 A1 | 1/2008 |
| WO | 2011134472 A1 | 11/2011 |

OTHER PUBLICATIONS

International Search report dated Jul. 13, 2020 for application No. PCT/EP2020/058685.

\* cited by examiner

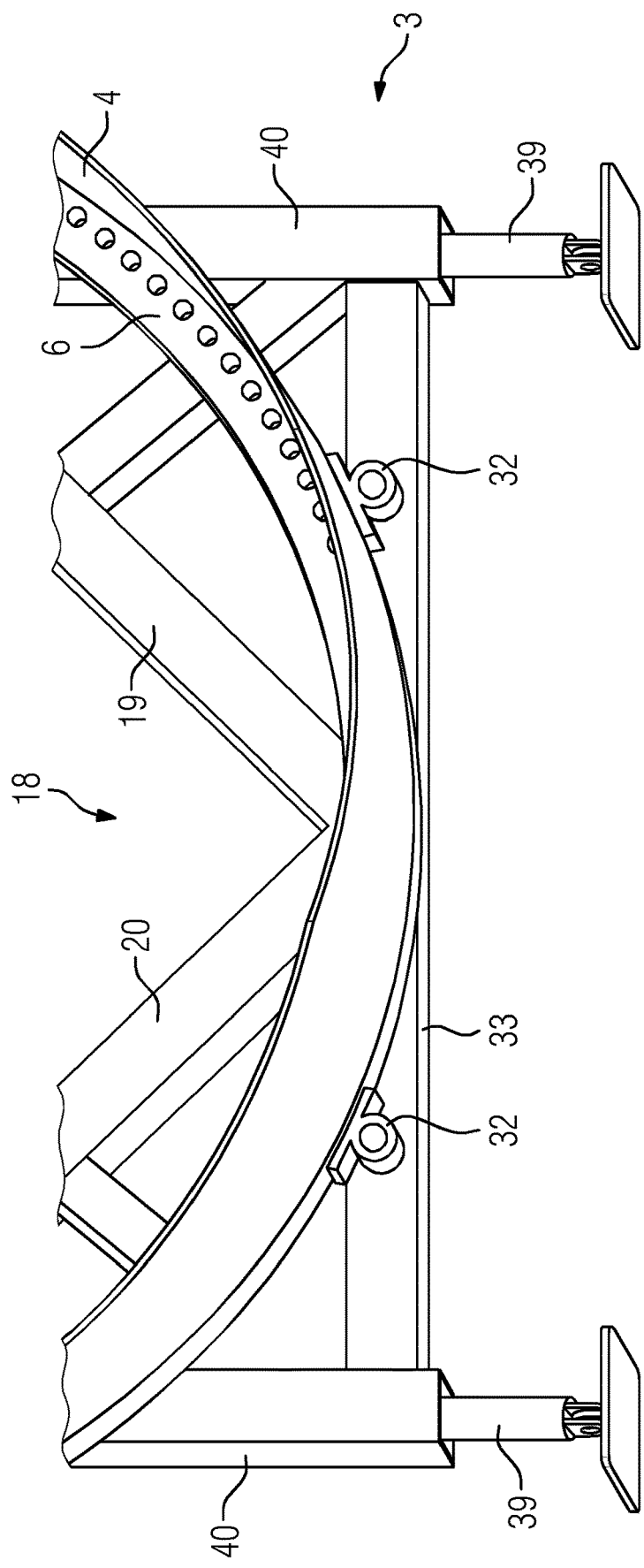

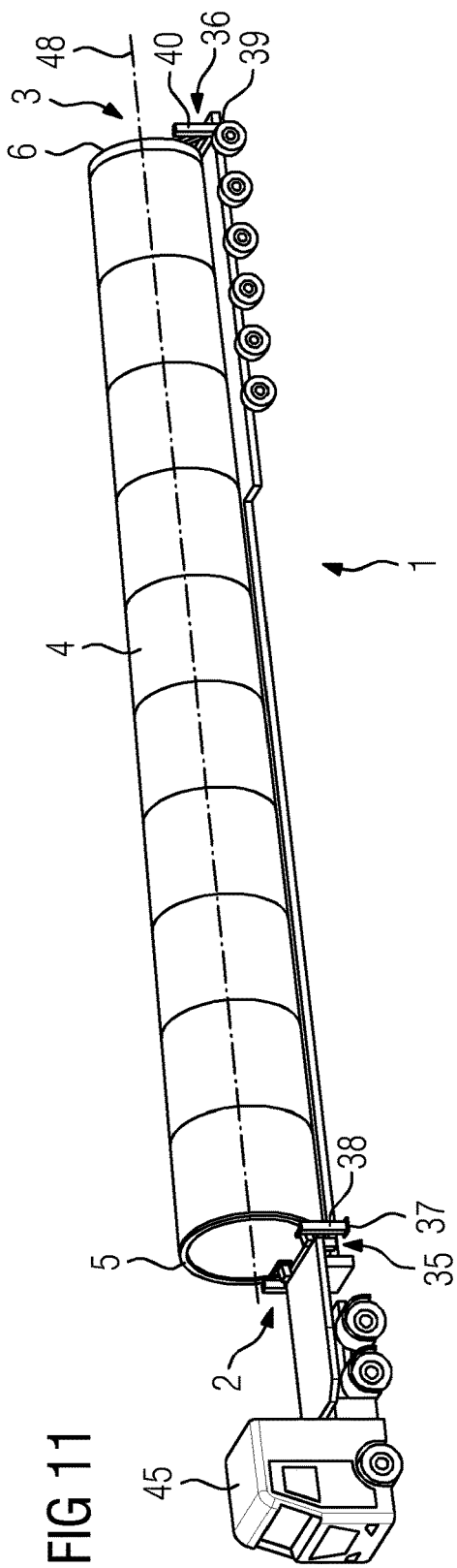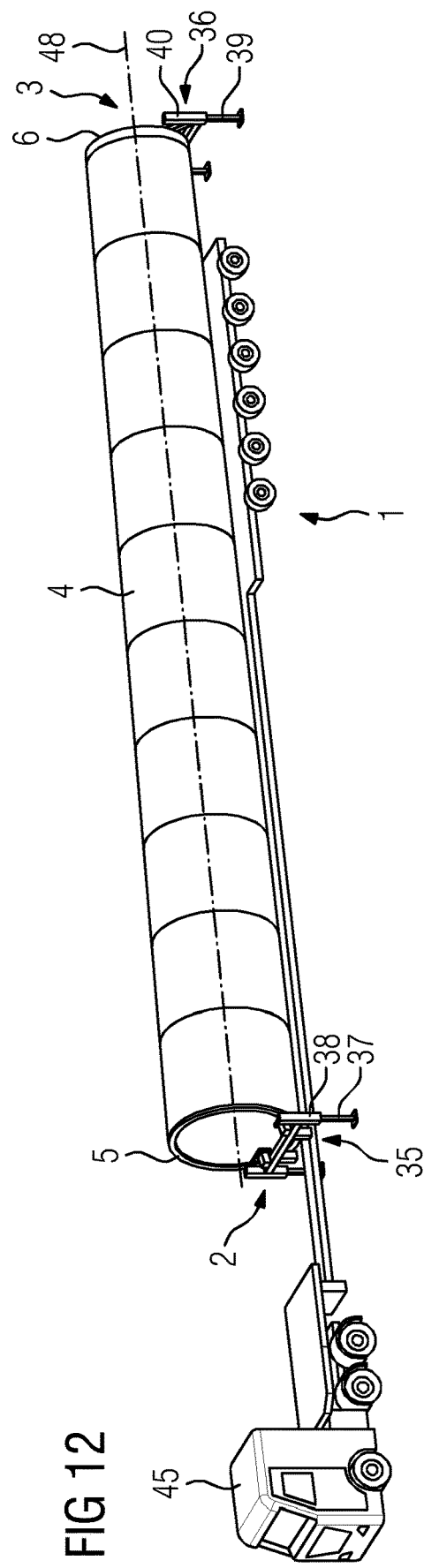

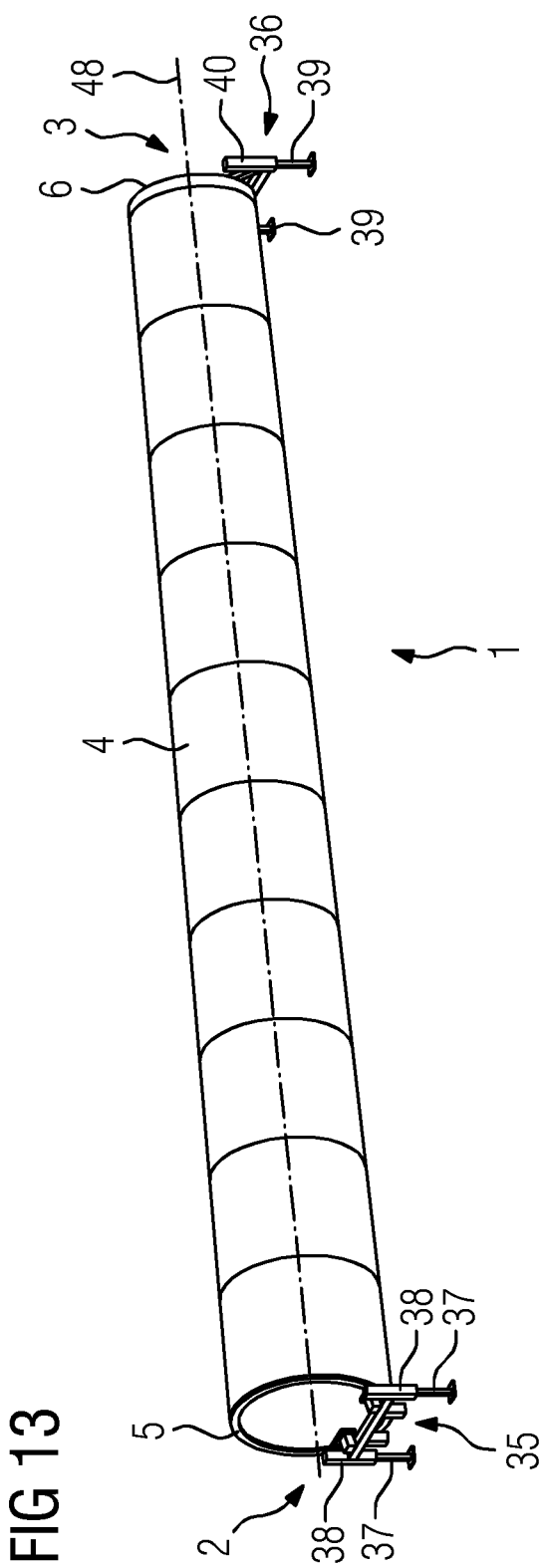

TOOL ARRANGEMENT FOR PIVOTING A TOWER OR A TOWER SEGMENT FROM A NON-ERECTED POSITION TO AN ERECTED POSITION

CROSS-REFERENCE TO RELATED APPLICATIONS

This application claims priority to PCT Application No. PCT/EP2020/058685, having a filing date of Mar. 27, 2020, which is based off of EP Application No. 19172753.6, having a filing date of May 6, 2019, the entire contents both of which are hereby incorporated by reference.

FIELD OF TECHNOLOGY

The following relates to a tool arrangement for pivoting a tower or a tower segment from a non-erected position to an erected position.

BACKGROUND

Many tower structures, especially tower structures of wind turbines, are pre-casted or comprise several pre-casted towers or tower segments. After transporting these towers or tower segments to the respective construction site, they have to be erected from a lying into a standing position. For this purpose, typically flange-like mounting sections of the tower or the tower segment are used, wherein two fastening bases are screwed to each of the mounting sections. Ropes or the like are then attached to the fastening bases and the tower or the tower segment is erected by two cranes, i.e. one crane for each mounting section of the tower or the tower segment. Typically, both cranes lift the tower or the tower segment a bit and then the crane on the mounting section on the upper side of the tower or the tower segment hoists the tower or the tower segment to erect it. Hoisting the tower or the tower segment on its lower side is required to avoid the tower or the tower segment being deformed or damaged during the erecting process.

SUMMARY

An aspect relates to provide an enhanced system for erecting a tower or a tower segment.

An aspect relates to a tool arrangement as initially described, which comprises a bottom tool device with a first device section with an attachment means to removably attach the first device section to a bottom mounting section of the tower or the tower segment, and with a second device section adapted to be arranged on the ground and being attachable or attached to the first device section, wherein the bottom tool device comprises a pivot axis at least when the first and the second device sections are attached to each other, wherein the tower or the tower segment, when fixed to the bottom tool device, is pivotable around the pivot axis when being erected, wherein, when the tower or the tower segment is fixed to the bottom tool device, the pivot axis is perpendicular to the longitudinal axis of the tower or the tower segment.

Typically, tower structures, especially of wind turbines, consist either of only one pre-cased tower or of several pre-casted tower segments which are attached to each other at their front ends. While in the following only the word "tower" is mentioned, the whole disclosure refers to tower segments as well.

To be connected to the ground, to a nacelle of the wind turbine or to each other, each of the towers typically comprises the bottom mounting section and a top mounting section. These mounting sections can be flange-like protrusions located on the tower wall on the top or bottom forehead of the tower directing radially inwards and can comprise several holes. The mounting sections are typically adapted to be connected with another mounting section of an adjacent tower segment or, if the bottom mounting section belongs to the undermost tower, to the ground or, if the top mounting section belongs to the uppermost tower, to the bottom of the nacelle of the wind turbine by connection means, e.g. bolts and nuts.

The first device section and/or the second device section can be or can comprise a plate and/or a frame with several beams.

While the first device section of the bottom tool device can be attached to the bottom mounting section of the tower, the second device section of the bottom tool device can be located on the ground of the respective construction site comprising a paved or graveled or another suitable underground.

The first device section and the second device section are attached or attachable to each other, providing a pivot or rotation axis. Since the first device section is attached to the bottom mounting section of the tower and the second device section is arranged on the ground, where the tower will be erected, there is no further safety arrangement required to secure the tower on its bottom side against slipping away or being damaged during the erecting process. Especially, for this purpose no crane is needed to hang up the tower on its bottom mounting section for the erecting process.

The pivot axis is perpendicular to the longitudinal axis of the tower and parallel to the plane defined by the ground. Thus, hoisting the tower, e.g. by a crane lifting the top section of the tower via a rope connected to the top mounting section, leads to a defined rotation of the tower about the pivot axis during the erecting process. Since there is only one crane needed to bring the tower from the non-erected position to the erected position, i.e. from a lying position to a standing position, embodiments of the present invention provide a simpler and cheaper opportunity to erect the tower compared to the previous method using two cranes.

In one embodiment of the invention, the first device section and the second device section are attached to each other non-detachably. In this embodiment, the bottom tool device can be brought into a space-saving folded state by pivoting the second device section about the pivot axis. In a preferred embodiment, both device sections can be removably attached to each other. During the transportation of the tower, wherein the first device section can be already mounted on the tower, the second device section can be transported independently from the first device section.

Axis forming means can be arranged at the first and the second device section, which axis forming means engage with each other when the first device section is attached to the second device section building the pivot axis. Components, which are attached to the first and/or the second device section or which are part of the first and/or the second device section can be used for this purpose. The geometrical shape of these components can allow these components to act together in such a way that the first device section and the second device section can rotate relatively to each other around the pivot axis.

The axis forming means can comprise a rod or at least two separate pins arranged at the first or the second device section and a rod or pin support arranged at the second or the first device section, wherein the rod or the pins engage in the rod or pin support building the pivot axis. The vertical, direction along the rod or pin is moved while getting inserted into the rod or pin support can be perpendicular to the longitudinal axis of the rod or the pin. The rod or pin support can be U-shaped to hold the respective rod or pin regarding the horizontal direction. The pivot axis is defined by the longitudinal axis of the rod or the pin.

The axis forming means can comprise rolling element bearings or wheels interacting with round, especially cupped, support sections.

In an embodiment of the present invention, the second device section can comprise a ground plate or frame with several ground spikes protruding from the plate or frame for fixing the plate or frame to the ground. During the erecting process of the tower, horizontal forces can occur acting on the second device section. Although mostly the friction between the second device section and the ground is large enough to avoid a slipping of the bottom tool device, the spikes sticking into the ground lead to a stabilisation regarding a possible horizontal slipping of the second device section. The spikes can be sticked into the ground by applying a vertical force to the second device section before erecting the tower and/or by the weight of the second device section and/or by the weight of the tower while being erected.

The tool arrangement can comprise a top tool device adapted to be coupled to a hoisting means, especially to a rope or a chain, comprising an attachment means to removably attach the top tool device to a top mounting section of the tower or the tower segment. Although the hoisting means, i.e. the rope or the chain or the like, can be mounted directly to the top mounting section of the tower to lift or erect the tower by a crane, coupling the top tool device to the hoisting means ensures a safe attachment of the tower to the hoisting means and a uniform force distribution acting on the top mounting section while erecting the tower.

The top tool device can comprise a first hoisting fastener and a second hoisting fastener to connect the top tool device to the hoisting means to hoist the tower or the tower segment attached to the top tool device. To avoid a vertical tilt of the tower hanging on the hoisting means after erecting the tower, the first hoisting fastener and the second hoisting fastener can be positioned along a diameter of the circular cross section of the tower being connected to the top tool device.

The attachment means of the bottom tool device and/or of the top tool device can comprise a first attachment device and a second attachment device, wherein the relative position between the first attachment device and the second attachment device is adjustable. It is possible that the position of only one attachment device is adjustable and the other attachment device is located at a fixed position regarding of the top tool device. In a preferred embodiment, the position of both attachment devices can be adjusted. By adjusting the relative position between the first attachment device and the second attachment device, towers with different diameters can be attached to the respective tool device. The relative position between the first attachment device and the second attachment device are adjustable such that the attachment devices can be attached to the respective mounting flange of the tower on opposite positions of the mounting flange.

The attachment devices can be clamping devices. Clamping the attachment devices to the, especially flange-like, mounting section of the tower provides a simple but also reliable connection between these components. The attachment devices can also be or comprise connecting means like bolts or screws or the like. Each clamping device can comprise a first clamping part and a second clamping part adapted to clamp the bottom mounting section or the top mounting section, especially the respective mounting flange, of the tower or the tower section in between.

The first device section of the bottom tool device and/or the top tool device can be or can comprise an, especially horizontal, main beam, wherein the first attachment device and/or the second attachment device is, along a longitudinal main beam axis, movably mounted on the main beam. Both attachment devices are movably mounted on the main beam. The main beam can act as a guiding rail for the attachment devices, wherein guiding means between the main beam and the respective attaching device like, e.g. sliding shoes or the like, can be provided.

Assuming that the respective tool is attached to the tower being in the non-erected position, the main beam can be, with respect to the ground, positioned at an elevated position. In this embodiment, the tool can be used together with supporting feet, which are often used as supporting means for towers in the non-erected position. Such supporting feet typically comprise a plain contact area adapted to rest on the ground and an arched or two chock-like contact areas (matching the tower diameter) adapted to support the tower. The tool device can be attached to the respective mounting section of the tower even while it is stored on supporting feet. Although such supporting feet are obsolete by using a tool arrangement according to embodiments of the present invention, supporting feet are and will probably still be used widely.

The first device section of the bottom tool device and/or the top tool device can be or comprise a V-shaped beam arrangement with a first beam and a second beam, wherein the first attachment device is, along a longitudinal first beam axis, movably arranged on the first beam and the second attachment device is, along a longitudinal second beam axis, movably arranged on the second beam. In this embodiment, the attachment means is movably in a diagonal direction. The attachment means can be brought into a position, where they can be attached to the respective mounting flange from both sides.

The longitudinal axes of the first and the second beam can be perpendicular to each other. In this embodiment, the relative position between the first attachment means and the second attachment means can be adjusted in a way that they can be attached to a circular mounting flange of the tower at, concerning the diameter of the tower, opposite sides. In this case and assuming the V-shaped beam arrangement and the ground or a horizontal beam connected with the V-shaped beam arrangement enclose an angle of 45°, the lower side of the mounting flange of the tower being in the non-erected position is, independent from the diameter of the tower, at the same position regarding the respective tool device allowing an optimized usage of support sections, as will be described later in more detail.

The first beam can act as a guiding rail for the first attachment device and the second beam can act as a guiding rail for the second attachment device. For this purpose, guiding means between the respective beam and the respective attachment device, like e.g. sliding shoes or the like, can be provided.

The first beam can comprise a, regarding its longitudinal axis, extendable first beam bar and the second beam can comprise a, regarding its longitudinal axis, extendable second beam bar, wherein the respective attachment device is attached to the respective beam bar. The respective attachment device is attached to an axial front end of the respective beam bar. By extending the beam bar, the length of the respective beam and, hence, the position of the respective attachment device, can be adjusted.

In an embodiment of the invention, the first hoisting fastener and the second hoisting fastener of the top tool device are located along a connecting line defined by the first attachment device and the second attachment device. Especially in the embodiment having the attachment devices positioned along a diameter line of the circular cross section of the tower, the respective positioning of the hoisting fasteners allow hanging the tower vertically, i.e. avoiding a vertical tilt, when hanging on a rope of the crane.

The top tool device can furthermore comprise a third hoisting fastener adapted to be connected with another rope of the crane. After removing the top tool device from the top mounting section of the tower (e.g., after the tower has been erected and mounted on the ground by its bottom mounting section) and hoisting the top tool device away by the crane, the top tool device could possibly rotate uncontrollably around an axis defined by the first hoisting fastener and the second hoisting fastener. To avoid this, the third hoisting fastener can be connected to another rope of the crane, leading the third hoisting fastener to act as a third fixing point of the top tool device avoiding these uncontrollable movements.

In an embodiment of the present invention, the first device section of the bottom tool device and/or the top tool device, especially the or a V-shaped beam arrangement or a horizontal beam, comprises a support section, wherein the tower or the tower segment rests on the support section if the tower or the tower segment is in the non-erected position and attached to the respective tool. The weight of the tower is not only held by the attachment means, especially by the clamping connection provided by the attachment means, but also by the support section. The support section can be a nose or a support plate.

Especially if the attachment means are arranged on the V-shaped beam arrangement, wherein the first beam and the second beam of the beam arrangement are perpendicular to each other, the support section can be located on or near the lower point of the V-shaped beam arrangement. Since, as described above, in this embodiment the lower point of the circular cross section of the tower is always at the same position, the support section supports the tower independently from the diameter of the tower. The support section can also be part of or attached to a plate of the respective tool device.

Especially a horizontal beam, which is connected to the lower point of the V-shaped beam arrangement, or the frame of the respective tool device can comprise two support sections. In this embodiment, the tool support sections are symmetrically spaced apart from the longitudinal middle axis (which is a symmetry axis) of the tool device.

The support section(s) can be support plates or noses or the like. If one central support section is provided to hold the tower at a central position, the contact area of the support section holding the tower is horizontal. There can also be provided two or more support sections additionally or alternatively to the central support section. These support sections are eccentrically positioned on the tool device, i.e. positioned apart to its middle axis, wherein the contact area of the support section is slanted. In this embodiment, the support sections can be used independently from the diameter of the tower.

The support section can be rotatably or pivotally attached to the respective tool device. In this embodiment, the contact area of the support sections automatically adjusts to the diameter of the tower when the tool device gets attached to the tower.

The bottom tool device and the top tool device can comprise a lifting means to lift the tower or the tower segment, when the tower or the tower segment is in the non-erected position and attached to the respective tool device. Typically, before getting transported to the construction site, the tower is loaded on a truck by clamping the tower between two trailers of the truck or attaching it on a trailer of the truck by, e.g. tension belts or the like. Already after loading the tower on the truck, the top tool device can be attached to the top mounting flange of the tower and the bottom tool device can be attached to the bottom mounting flange.

After arriving at the construction site, the lifting means of the top tool device and the bottom tool device can be used to lift the tower so that the weight of the tower weighs on the tower lifting means instead of the truck. After this, the unloaded truck can be driven away. Hence, no crane for unloading the tower is required. Furthermore, the tower can be stored temporarily on the construction site in the non-erected position without needing the truck or cranes or the like but only being supported by the bottom tool device and the top tool device.

Each lifting means can be or can comprise at least two extendable pillars. Assuming that the tower is in the non-erected position and the tool devices are attached to the respective mounting flanges, the extendable pillars can be extended downwards to lift the tower. The tower can be lifted just a few centimetres or decimetres. After this, the unloaded truck can drive away, i.e., when the tower is lifted, the truck can drive beneath the tower, along the longitudinal axis of the tower, between two extended pillars until he has completely left the area of the tower.

The pillars can be arranged at the sides of the bottom and the top tool device. In this embodiment, the distance between the pillars is maximised leading to a safe storage of the tower, e.g. wind or the like cannot upset the system with the tower and the tool devices easily.

The bottom tool device and/or the top tool device can comprise pneumatic or hydraulic means for operating and/or positioning the attachment means and/or for operating the lifting means. A control device for controlling the operation of the pneumatic or hydraulic means can be provided. The control device can be configured to generate respective control commands depending on signals from an input device, e.g. from a non-portable input device attached to the respective tool device or a portable input device, e.g. a mobile phone, tablet or the like.

The bottom tool device or the top tool device can comprise an, especially box-like, power pack to provide the power supply for the respective tool device, especially for the pneumatic or hydraulic means. The power pack can comprise or be equipped with an accumulator. The power pack can be mounted freely rotatably on the respective tool device and can be equipped with balance weights to ensure that the power pack is aligned horizontally at all times, especially during the erecting process of the tower. In this embodiment, a leakage or spill of battery liquid is avoided. To store tools, especially tools for mounting or dismounting the tool device to or from the hoisting means, the top tool device and/or the bottom tool device can comprise a tool box. Alternatively, tools can also be stored within the power pack.

The tool arrangement can comprise a transportation device attachable to the top tool device and the bottom tool device. For transportation, e.g. for sea transportation, several towers are often stacked one upon the other in the non-erected position. To connect the top/bottom tool devices attached to these towers and positioned on top of each other, the tool arrangement further comprises the frame- or plate-like, transportation device. The transportation device is adapted to be connected to one tool at one side and to another tool at the opposite side, e.g. screws, clamping fasteners and/or other suitable attaching means.

The top tool device and/or the bottom tool device can comprise a mounting means allowing the tool device to be brought to the respective mounting flange simply. The mounting means being attachable or attached to the respective tool device and comprises two fork pockets allowing the respective tool device to be transported and hoisted to the mounting flange (of the tower typically already loaded on the truck) by a telescopic handler or pallet transporter.

The top tool device and the bottom tool device can furthermore comprise storing pillars. The storing pillars can be extendable from the frame of the respective tool device. Alternatively, the storing pillars can also be attachable to the frame by suitable attachment means. When attached to the frame, the storing pillars can point into a direction perpendicular to the plate or the frame of the respective tool device, especially into a direction perpendicular to the extendable pillars acting as the lifting means. Several tool devices can be stored or transported by stacking them, wherein each storing pillar rests on a respective storing pillar support of the tool device located next to the respective tool device. The storing pillar support can be a recessed section of the surface of the plate or the frame of the tool device.

Although the top tool device and the bottom tool device are mainly discussed apart from each other, basically the top tool device can be used as the bottom tool device and vice versa. Since the top mounting section and the bottom mounting section, which are in many cases mounting flanges, are based on the same principle the top tool device can be connected to the bottom mounting section as well and also the bottom tool device (or at least the first device section of the bottom tool device) can be connected to the top mounting section. Hence, the tool arrangement can comprise a top tool device, which is identically to the bottom tool device or the first device section of the bottom tool device. Providing components of the tool arrangement based on the same construction simplifies the handling of the tool arrangement as well as its manufacturing.

BRIEF DESCRIPTION

Some of the embodiments will be described in detail, with reference to the following figures, wherein like designations denote like members, wherein:

FIG. 10 shows a detailed view of the top tool device of FIG. 6, being attached to the tower;

FIG. 11 shows the tool arrangement together with the tower in the non-erected position and loaded on a truck;

FIG. 12 shows the tool arrangement from FIG. 11 unloaded from the truck, wherein the truck is leaving the tower;

FIG. 13 shows the tool arrangement from FIG. 12 unloaded from the truck, wherein the truck has heft the tower;

DETAILED DESCRIPTION

Figure 1:
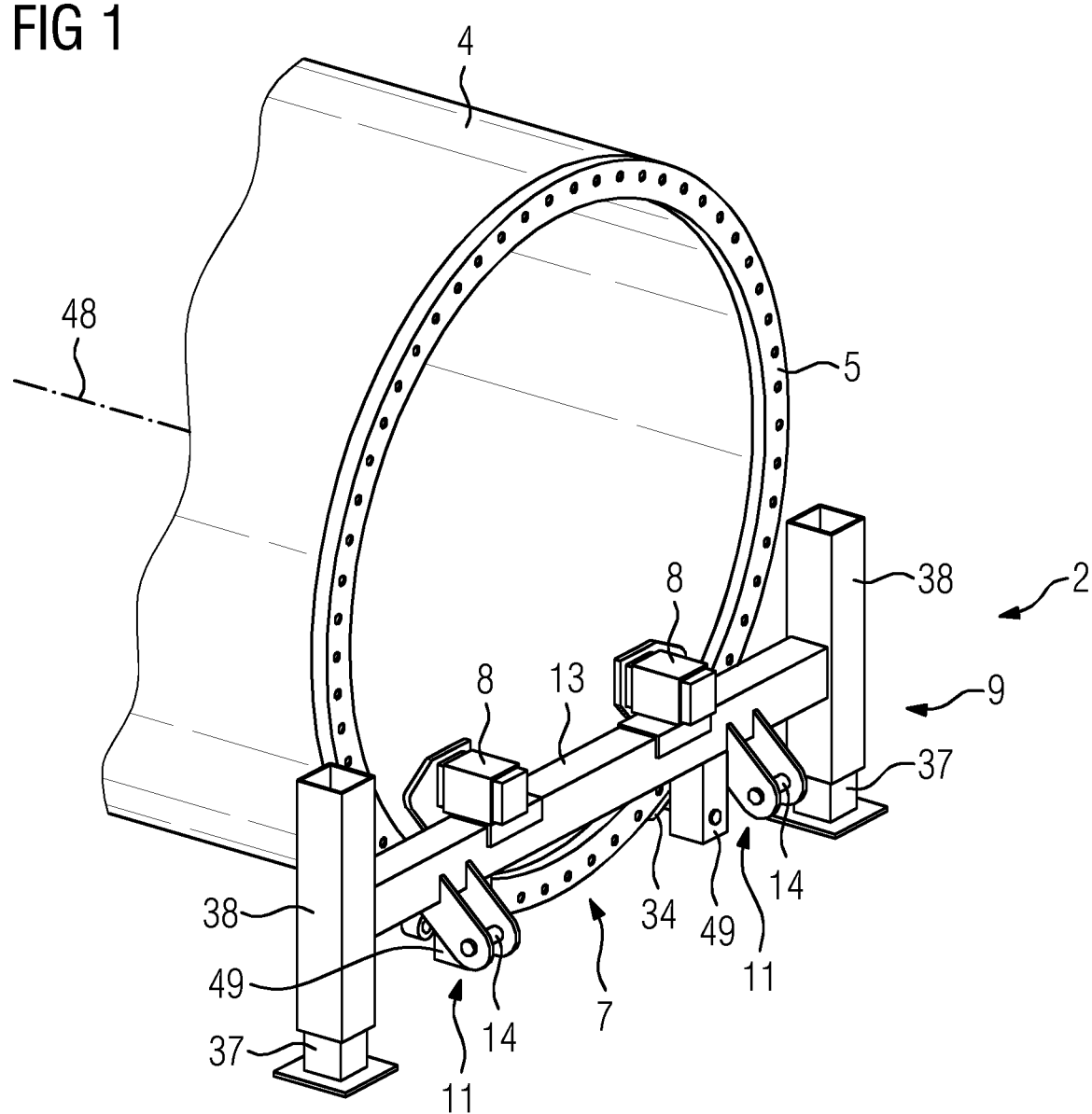
FIG. 1 shows a first device section of a bottom tool device of an embodiment of the tool arrangement according to the present invention, in a state where it is not attached to a tower.

A tool arrangement 1 according to embodiments of the present invention comprises a bottom tool device 2 and a top tool device 3. The tool arrangement 1 is provided to simply pivot the tower 4 from a non-erected position (FIGS. 1-4) to an erected position (FIG. 5) and to unload the tower 4 from a transport vehicle and store the tower 4 on a construction site with only little effort (FIGS. 11 and 12).

The tower 4 is exemplarily a hollow, tubular and pre-casted tower segment of a tower structure of a wind turbine. The tower 4 has a circular cross section and comprises a bottom mounting section 5 on its lower axial end and a top mounting section 6 on its upper axial end. Exemplarily, the mounting sections 5, 6 are mounting flanges pointing radially inwards and comprising several holes. The complete tower structure of the wind turbine consists of several towers 4 standing one above the other, wherein the towers 4 are attached to each other by the mounting sections 5, 6 by screws and nuts or other suitable attachment means.

Figure 2:
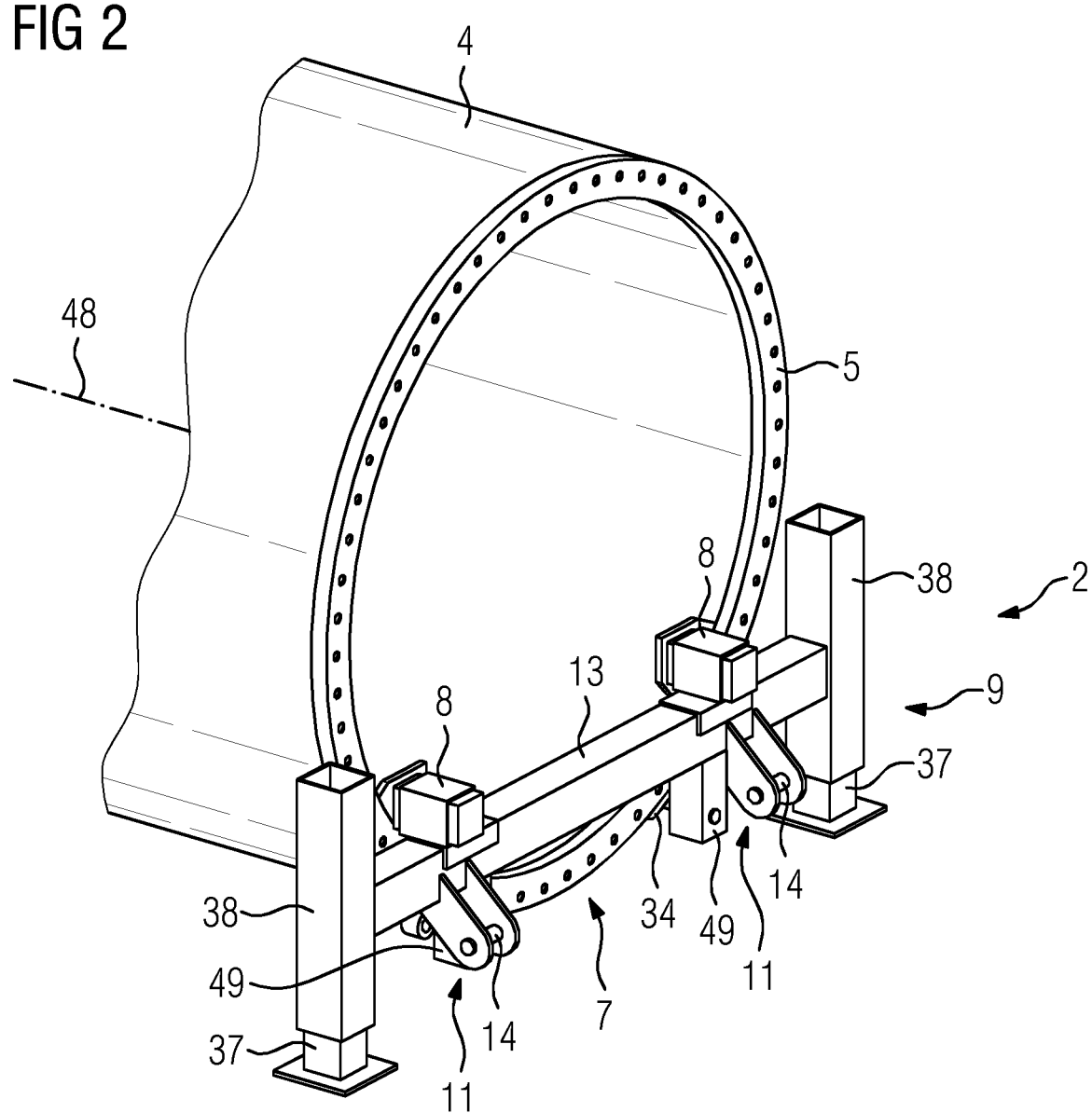
FIG. 2 shows the first device section of FIG. 1 attached to the tower.

As shown in FIGS. 1 and 2, the bottom tool device 2 comprises an attachment means 7 consisting of two attachment devices 8. The attachment devices 8 are mounted on a first device section 9 of the bottom tool device 2. The first device section 9 is removably attachable to the bottom mounting section 5 of the tower 4 by the attachment means 7. In FIG. 1, the first device section 9 is not attached to the bottom mounting section 5 and in FIG. 2 the first device section 9 is attached to the bottom mounting section 5. As will be described later in more detail, for this purpose the attachment means 7 are moved along a horizontal axis to attach the first device section 9 to the tower 4.

Figure 3:
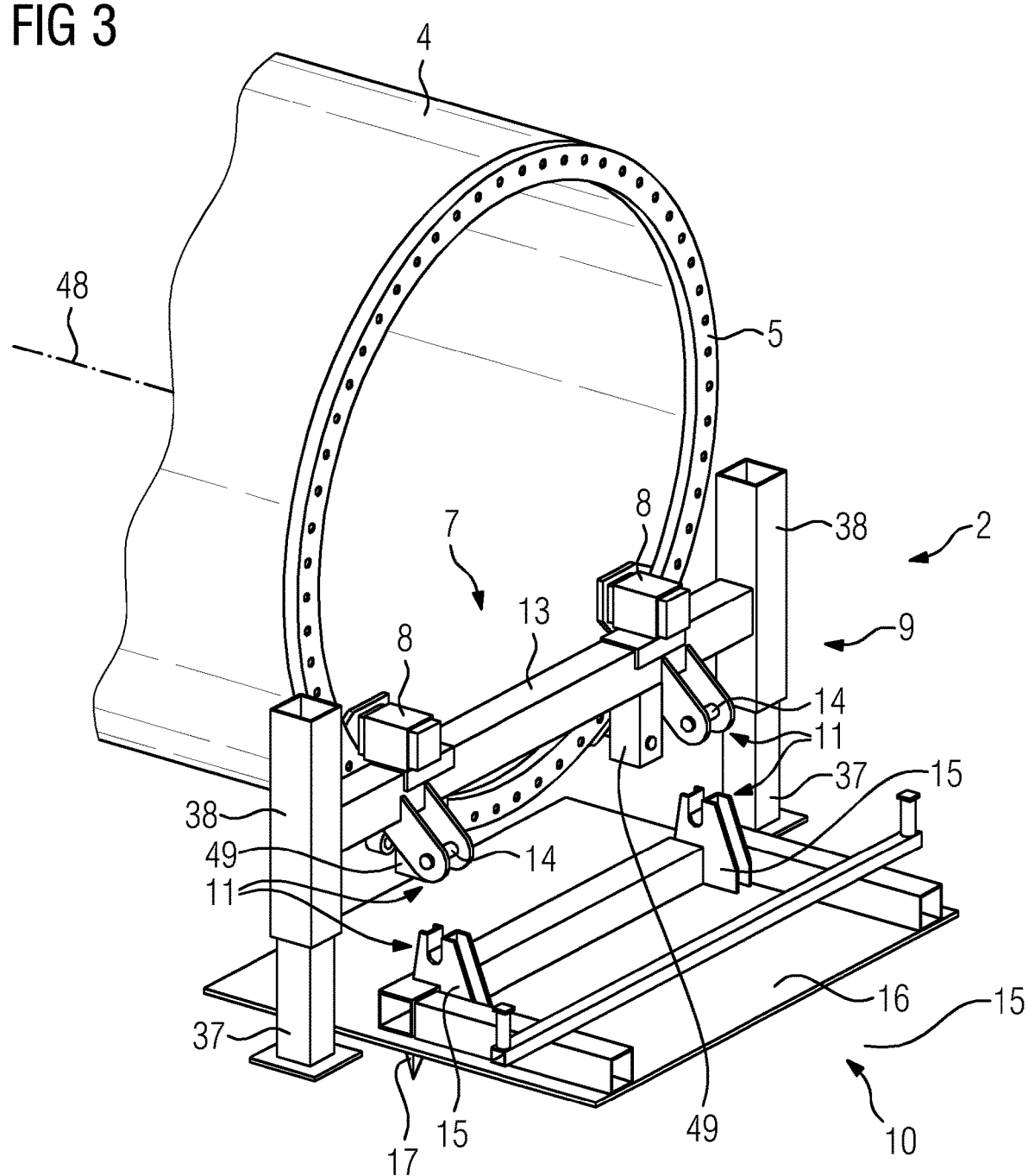
FIG. 3 shows the first device section together with a second device section from the bottom tool device of FIGS. 1 and 2, not attached to each other and the tower being in a non-erected position.
Figure 4:
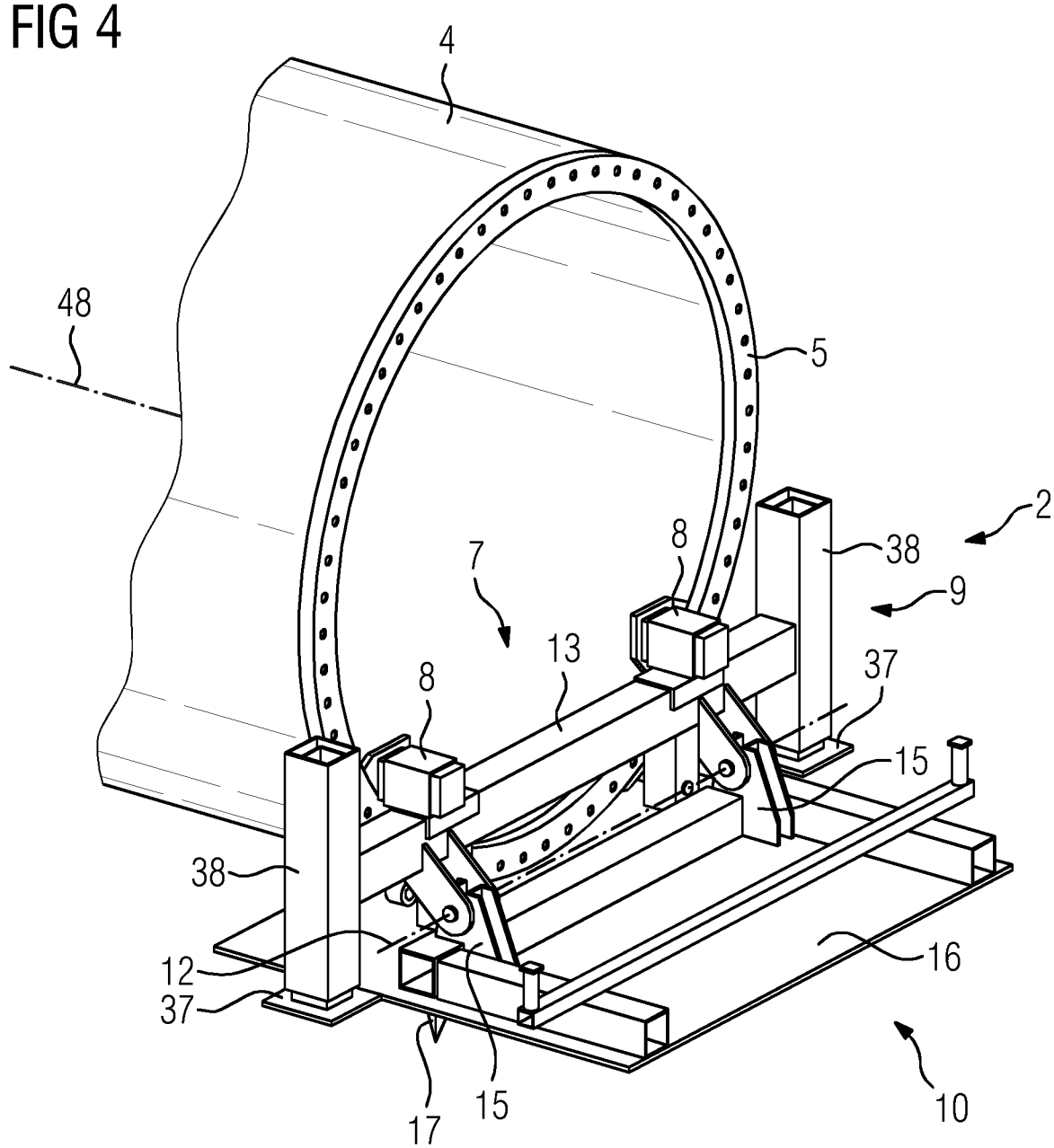
FIG. 4 shows the first device section and the second device section from FIG. 3, attached to each other and the tower being in the non-erected position.

Referring to FIGS. 3 and 4, the second device section 10 of the bottom tool device 2 will be explained in more detail. As it will be described later, in FIG. 3 the first device section 9 is standing on the ground carrying the weight of the tower 4. The second device section 10 is also arranged on the ground beneath the first device section 9.

The first device section 9 and the second device section 10 are attachable to each other by axis forming means 11. FIG. 3 shows the device sections 9, 10 not attached to each other and FIG. 4 shows the device sections 9, 10 attached to each other. The axis forming means 11 engage with each other when the device sections 9, 10 are attached to each other and build a pivot axis 12 of the bottom tool device 2. Hence, the tower 4, when fixed to the bottom tool device 2, can be pivoted around the pivot axis 12, wherein the pivot axis 12 is perpendicular to a longitudinal axis 48 of the tower 4 and parallel to the second device section 10 to the ground where the tower 4 will be erected.

Figure 5:
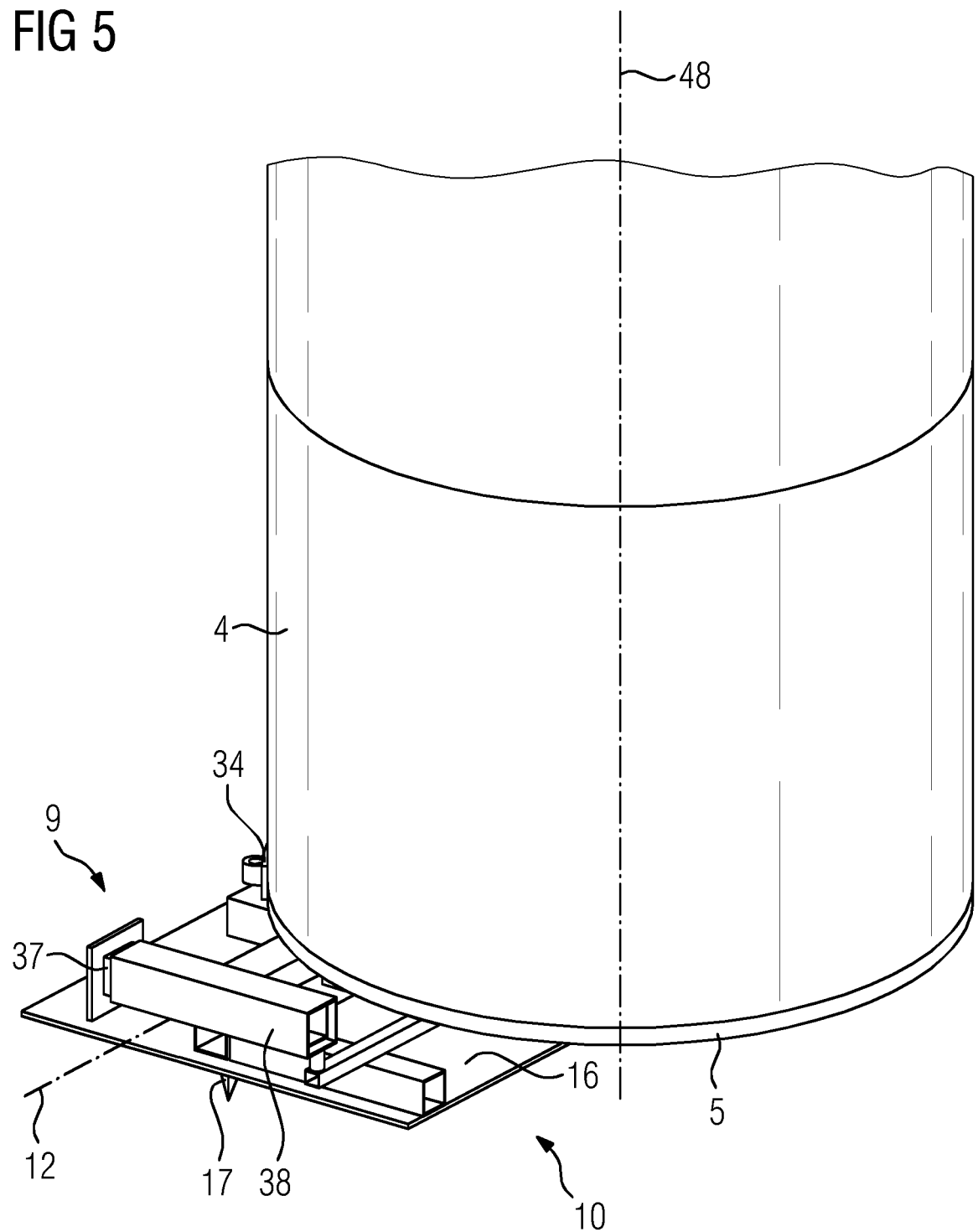
FIG. 5 shows the first device section and the second device section from FIGS. 3 and 4, the tower being in an erected position.

Rotating the tower 4 around the pivot axis 12 allows for pivoting the tower 4 from the non-erected position (FIG. 4) to the erected position (FIG. 5). For this, the tower 4 only needs to be lifted or hoisted by a crane, e.g. by a rope attached to the top mounting section 6 of the tower 4. Another crane securing the tower 4 on the bottom mounting section 5 while erecting the tower is not required, since the bottom tool device 2 provides a safe and secure support of the lower tower end while getting erected.

Next, the attachment means 7 of the bottom tool device 2 will be described in more detail. The first device section 9 comprises a horizontal main beam 13, wherein the attachment devices 8 are movably mounted on the main beam 13 along a longitudinal axis of the main beam 13. FIGS. 1 and 2 illustrate the mechanism attaching the attachment devices 8 to the bottom mounting section 5. After positioning the first device section 9 to the bottom mounting section 5, the attachment devices 8 are moved away from each other along the longitudinal axis of the main beam 13 leading the attachment devices 8 to engage behind the bottom mounting section 5. Hence, as shown in FIG. 2, the bottom mounting section 5 is clamped between each of the attachment devices 8 and the main beam 13 of the first device section 9. Since, as will be described later in more detail, the tower 4 furthermore rests on support sections 34, a safe and secure fixation, especially during the erecting process, of the tower 4 is ensured.

Next, the axis forming means 11, consisting of two pins 14 and two pin supports 15, will be described in more detail. The first device section 9 comprises the pins 14 and the second device section 10 comprises the pin supports 15. The pins 14 are adapted to be inserted into the U-shaped pin supports 15, wherein the longitudinal axis of the pins 14 are aligned to each other forming the pivot axis 12. Inserting the pins 14 into the pin supports 15 is illustrated by FIGS. 3 and 4. The tower 4, together with the first device section 9, is lowered to insert the pins 14 into the pin supports 15. Details concerning this lowering will be described later in more detail.

Next, the second device section 10 will be described in more detail. The second device section 10 comprises a ground plate 16 with several ground spikes 17 protruding from the plate 16. The spikes 17 are provided to protect the second device section 10 from slipping on the ground while the tower 4 is erected. When the tower 4 is lowered (like shown in FIGS. 3 and 4) the weight of the tower 4 leads the ground plate 16 getting pressed towards the ground, leading the spikes 17 getting sticked into the ground. To ensure a stable and secure footing, the ground can be graveled.

Figure 6:
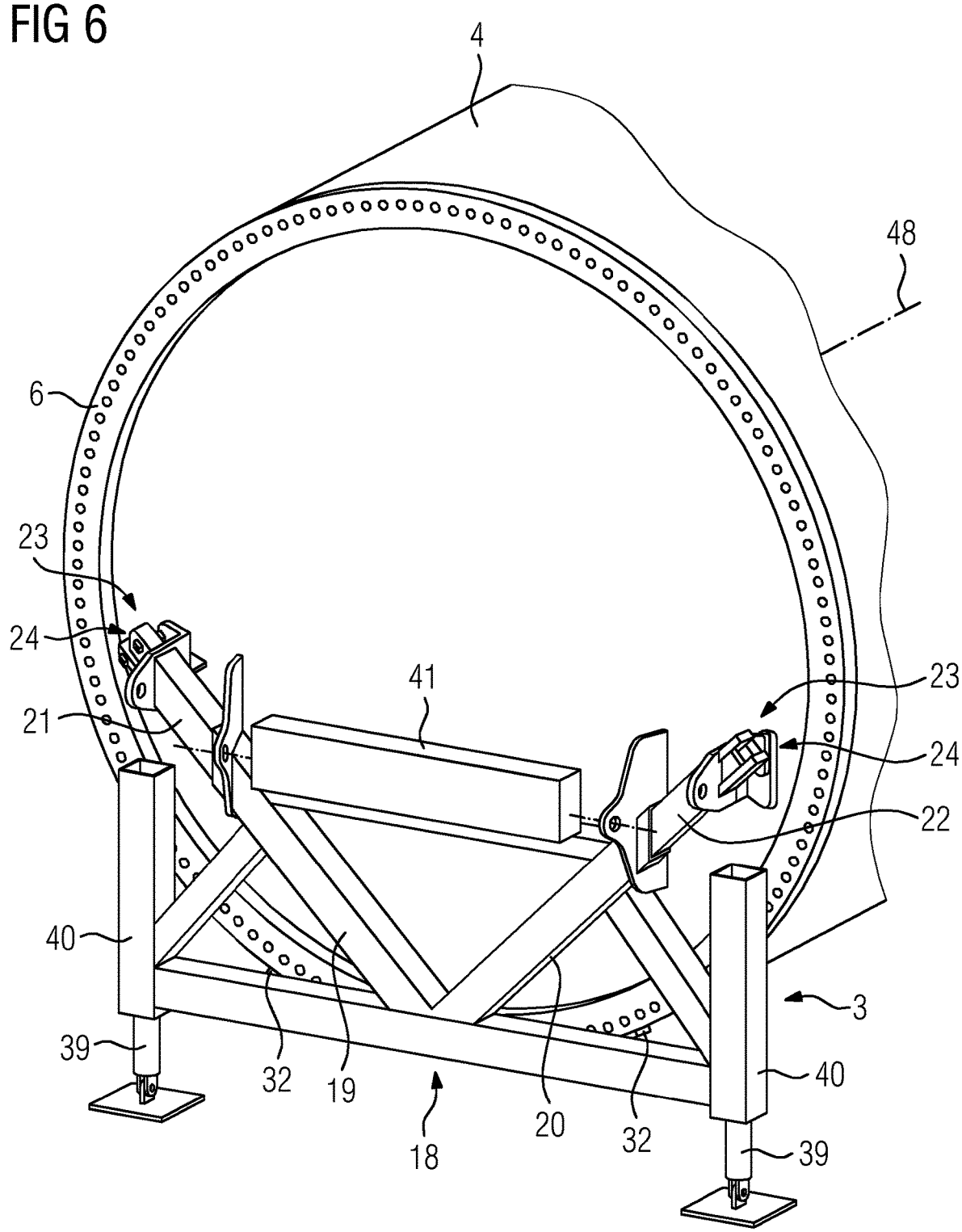
FIG. 6 shows a top tool device of the embodiment of the tool arrangement according to FIGS. 1 to 5, being not attached to the tower.

The top tool device 3 is a frame-like structure comprising a V-shaped beam arrangement 18 with a first beam 19 and a second beam 20, wherein the longitudinal axes of the beams 19, 20 are perpendicular to each other (FIG. 6). The first beam 19 comprises an extendable first beam bar 21 and the second beam 20 comprises an extendable second beam bar 22. Each attachment means 23 is an attachment device 24 located at the axial front end one of the beam bars 21, 22. The attachment devices 24 are clamping devices comprising a first clamping part 25 and a second clamping part 26.

Figure 7:
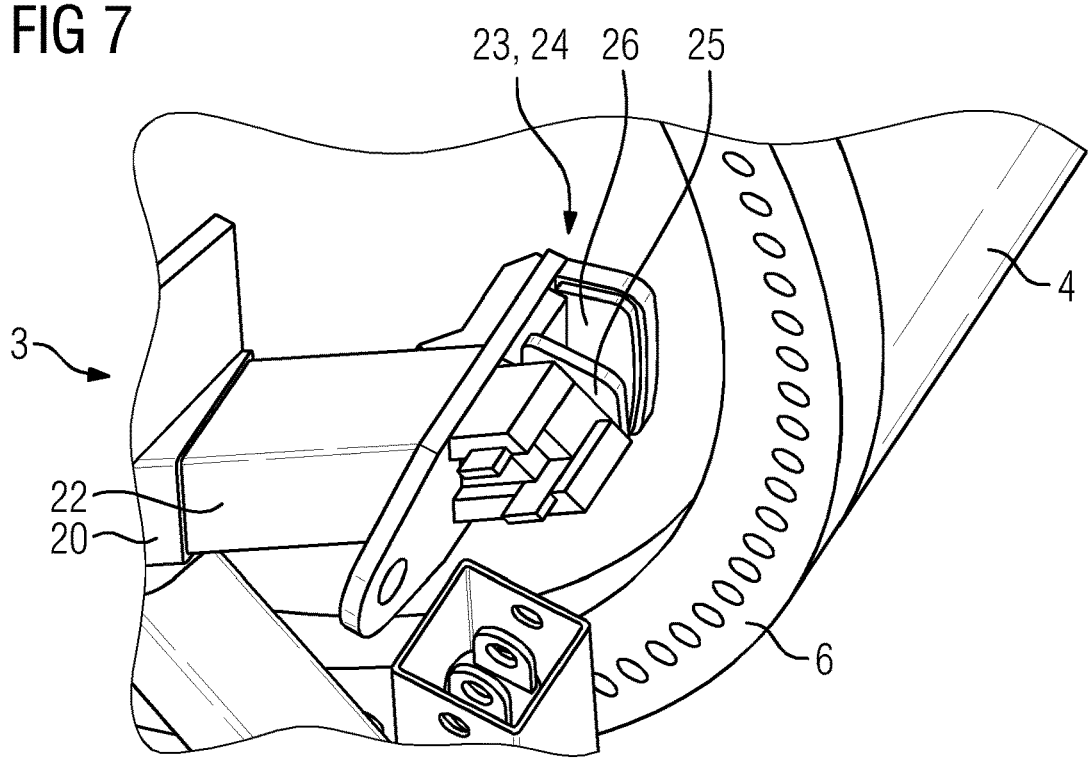
FIG. 7 shows a detailed view of the top tool device of FIG. 6.
Figure 8:
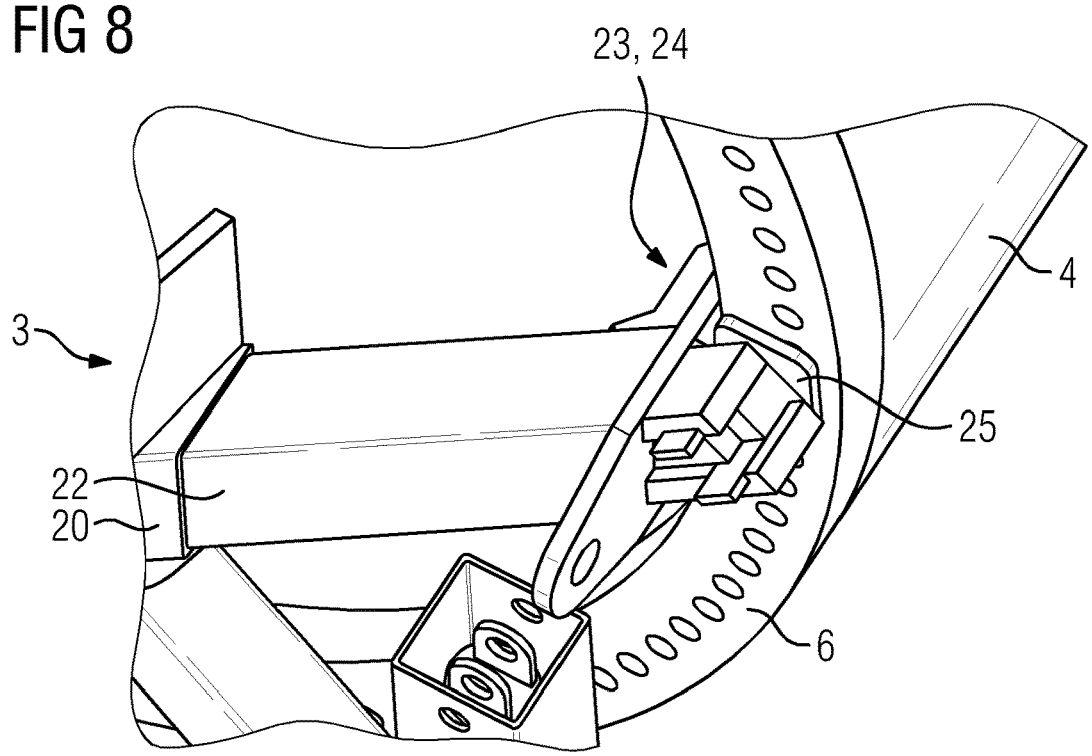
FIG. 8 shows a detailed view of the top tool device of FIG. 6, being attached to the tower.

Details of attaching the top tool device 3 to the top mounting section 6 are illustrated in FIGS. 7 and 8, where an enlarged view of the attachment device 24 of the second beam bar 22 is shown. In FIG. 7, the top tool device 3 is not attached to the top mounting section 6. In FIG. 8 the beam bars 21, 22 are extended to position the top mounting section 6 between the clamping parts 25, 26. Next, the top mounting section 6 can be attached to the top tool device 3 by clamping the clamping parts 25, 26. Extending the beam bars 21, 22 and clamping the attachment devices 24 occurs via hydraulic or pneumatic means (not shown).

Figure 9:
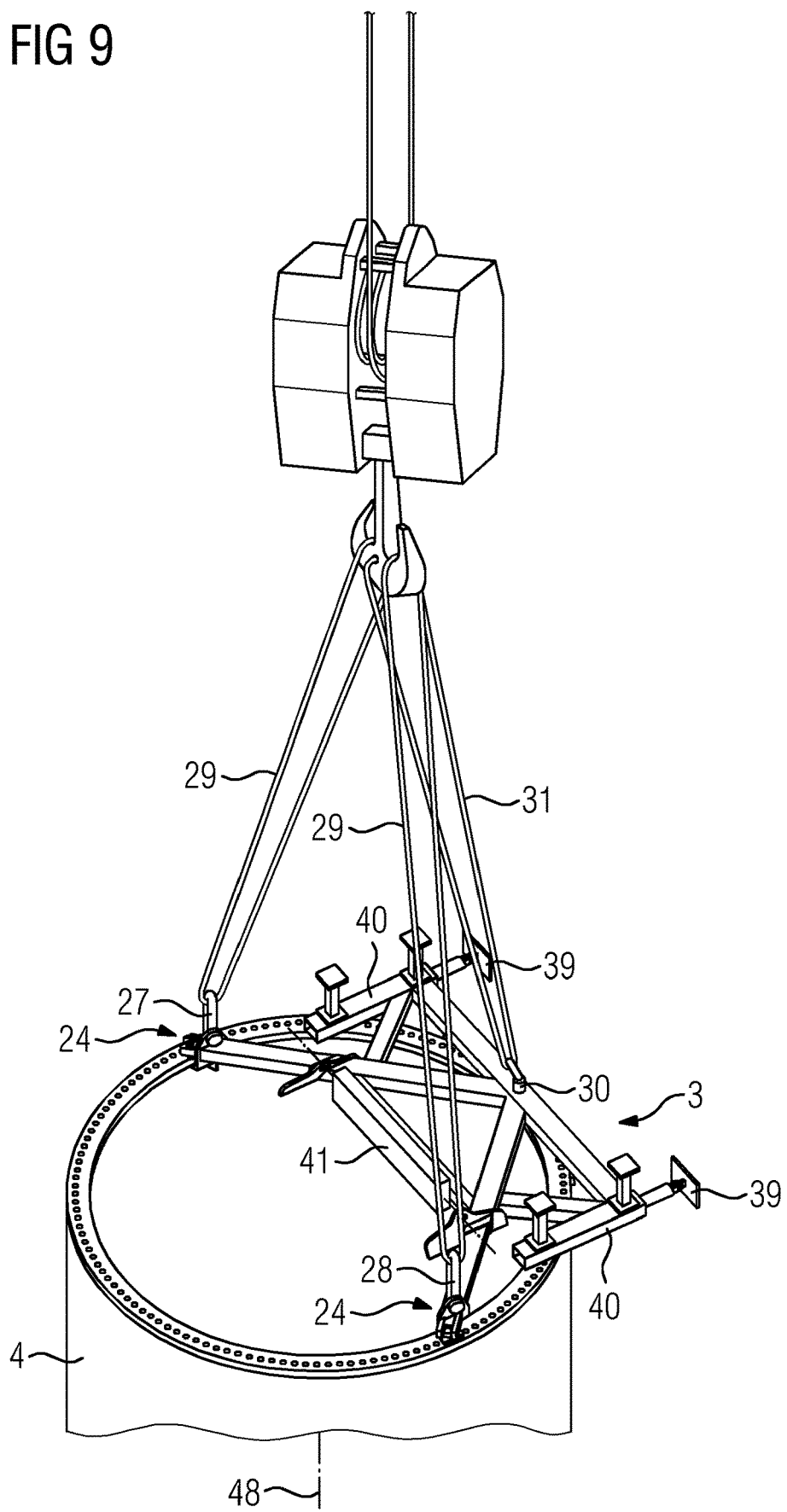
FIG. 9 shows the top tool device from FIGS. 6 to 8, being attached to the tower and hanging on ropes of a crane, the tower being in the erected position.

Further aspects of the top tool device 3 are illustrated in FIG. 9. Due to the right angle between the first beam 19 and the second beam 20, the attachment devices 24 can be clamped to the top mounting section 6 diametrically opposed to each other. Along this diameter, the top tool device 3 comprises a first hoisting fastener 27 and a second hoisting fastener 28 to connect the top tool device 3 to hoisting means 29, i.e. to ropes of a crane. The hoisting fasteners 27, 28 can be loops or hooks.

After being erected, the tower 4 is hoisted to the position where it has to be mounted by the crane. If the tower 4 is the undermost tower section of the complete tower, the tower 4 has to be hoisted or brought to the foundation where it has to be mounted. Otherwise, the tower 4 has to be hoisted to the (already erected and mounted) tower section, on whose top mounting section the bottom mounting section 5 of the tower 4 will be mounted. However, after the tower 4 has been erected and before it gets hoisted to its designated position, the bottom tool device 2 has to be detached from the bottom mounting section 5 of the tower 4. For this purpose, immediately after the tower 4 has been erected and still hangs on the hoisting means 29 of the crane, staff can detach the attachment means 7. After this, the crane can hoist the tower 4 away, wherein the bottom tool device 2 remains at its position on the ground.

Since the hoisting fasteners 27, 28 are positioned along the circular diameter of the tower 4, a tilt of the tower 4 is avoided while it is hoisted away.

After the tower 4 has been hoisted to its designated position and mounted, the top tool device 3 can be detached from the top mounting section 6, e.g. by climbing staff. Next, the top tool device 3 can be hoisted or brought away from the tower 4 by the crane. To avoid the top tool device 3 swinging around the axis provided by the hoisting fasteners 27, 28, respectively, a third hoisting fastener 30 of the top tool device 3 is provided to be connected with another hoisting means 31, e.g. another rope, of the crane.

Another aspect concerning the top tool device 3 is shown in FIG. 10, where, compared to FIG. 4, the top tool device 3 is shown in part from its back side. The top tool device 3 comprises two support sections 32 attached to a horizontal beam 33 on which the V-shaped beam arrangement 18 is attached. The tower 4 rests on the support sections 32 when the tower is in the non-erected position and attached to the top tool device 3. The support sections 32 of the top tool device 3 are arranged symmetrically to the symmetry axis of the also symmetric V-shaped beam arrangement 18. Hence, the weight of the tower 4 is not only held by the attachment devices 24 but also by the support sections 32. Additionally or alternatively, a support section can also be provided on the V-shaped beam arrangement 18, especially on its lower edge.

In analogy to this, the bottom tool device 2 also comprises two support sections 34, which are attached to a bar 49 protruding vertically downwards from the main beam 13 (see e.g. FIG. 1). The support sections 34 are positioned symmetrically to a vertical symmetry axis of the bottom tool device 2.

The support sections 32, 34 are rotatably attached to the respective tool device 2, 3. Hence, the contact area of the support sections 32, 34 automatically adjusts to the diameter of the tower 4 when the tool device 2, 3 gets attached to the respective mounting section 5, 6.

Next, aspects concerning the transportation of the tower 4 to the construction side and the unloading process of the tower 4 from a transport vehicle, especially from a truck 45, will be described in detail. Typically, before getting transported to the construction site, the tower 4 is loaded on the truck 45. The tower 4 is fastened to the truck 45 by attaching it on a trailer of the truck 45 by, e.g. tension belts. Even before transporting the tower 4 to the construction side, the first device section 9 of the bottom tool device 2 is attached to the bottom mounting section 5 and the top tool device 3 is attached to the top mounting section 6. FIG. 11 shows the situation, where the tool devices 2, 3 are attached to the tower 4, wherein the tower 4 is loaded on the truck 45.

To simplify the unloading process of the tower 4 from the truck 45, the first device section 9 of the bottom tool device 2 comprises a lifting means 35 and the top tool device 3 comprises a lifting means 36. The lifting means 35 comprises two extendable pillars 37 which can be extended from vertical beams 38 of the first device section 9 of the bottom tool device 2. In analogy to this, the lifting means 36 also comprises two extendable pillars 39, which are extendable from vertical beams 40 of the top tool device 3. The pillars 37, 39 are not extended while the tower 4 is transported to the construction side by the truck 45 (see FIG. 11). In this situation, the weight of the tower 4 weighs on the truck 45.

After arriving at the construction site, after placing the truck 45 to the position where the tower 4 shall be unloaded and after removing or loosening the tension belts, the pillars 37, 39 of the tool devices 2, 3 are extended towards the ground by hydraulic and pneumatic means. During the extending process, the pillars 37, 39 get in contact with the ground (which should be firm and stable). All pillars 37, 39 get in touch with the ground at the same time. After this, the pillars 37, 39 are extended further (exemplarily some centimetres or decimetres) so that the weight of the tower 4 does not weigh on the truck 45 anymore, but on the pillars 37, 39. Additionally the tower 4 will be lifted or raised during this process, ideally by the same distance as the pillars 37, 39 are further extended after getting into contact with the ground.

Although in this situation the truck 45 is still located beneath the tower 4, the truck 45 is not connected to the tower 4 anymore. Since the distance between the pillars 37 of the bottom tool device 2 (which is exemplarily located at the side of the tower 4 facing the truck 45), and also the distance between the pillars 39 of the bottom tool device 3 is larger than the width of the truck 45 respectively its trailer, the truck 45 respectively the trailer can just drive straight ahead to leave the position where the tower 4 has been unloaded. FIG. 12 shows the tower 4 with the tool devices 2, 3 being attached to the mounting sections 5, 6 and the pillars 37, 39 being extended after the truck 45 is leaving the tower 4. FIG. 13 shows the tower 4 after the truck 45 has left the construction site.

Hence, the tool arrangement 1 allows for unloading the tower 4 from the truck 45 without the need of a crane. So far, for unloading the tower 4 even two cranes have been required, wherein each side of the tower 4 has been hoisted by one of the two cranes, the truck 45 has been driven away and the cranes have lowered the tower 4 to store it on supporting feet.

Supporting feet are often used as supporting means for towers in the non-erected or lying position. Such supporting feet typically comprise a plain contact area adapted to rest on the ground and an arched or two chock-like contact areas adapted to support the tower 4 on its outer wall. Instead of support feet, the tool arrangement 1 can be used to store the tower 4 temporarily on the construction site, being supported by the tool devices 2, 3 (see. FIG. 13). For this, no further action is needed to store the tower 4 after being unloaded from the truck 45 as described above. Since the tool devices 2, 3 are attached to the tower 4 on its attachment means 5, 6, a contact of the outer wall to the ground or tower feet, leading to an unwanted deformation or scratches of the tower 4, during the storage of the tower 4 is avoided.

As a next step (again referring to FIG. 13) the tower 4 can be erected. First, the second device section 10 of the bottom tool device 2 is located beneath the first device section 9, as shown in FIG. 3. Retracting the pillars 37, 39 makes the axis forming means 11 to engage with each other forming the pivot axis 12 (as shown in FIG. 4).

To supply the top tool device 3 (and possibly also the bottom tool device 2), especially the hydraulic means, with electricity, the top tool device 3 comprises a power pack 41. The power pack 41 comprises an accumulator (not shown) and is freely rotatable about a horizontal axis to be always aligned horizontally, especially during erecting the tower 4. For this purpose, the power pack 41 is equipped with weights at its lower side avoiding battery liquid getting spilled.

Figure 14:
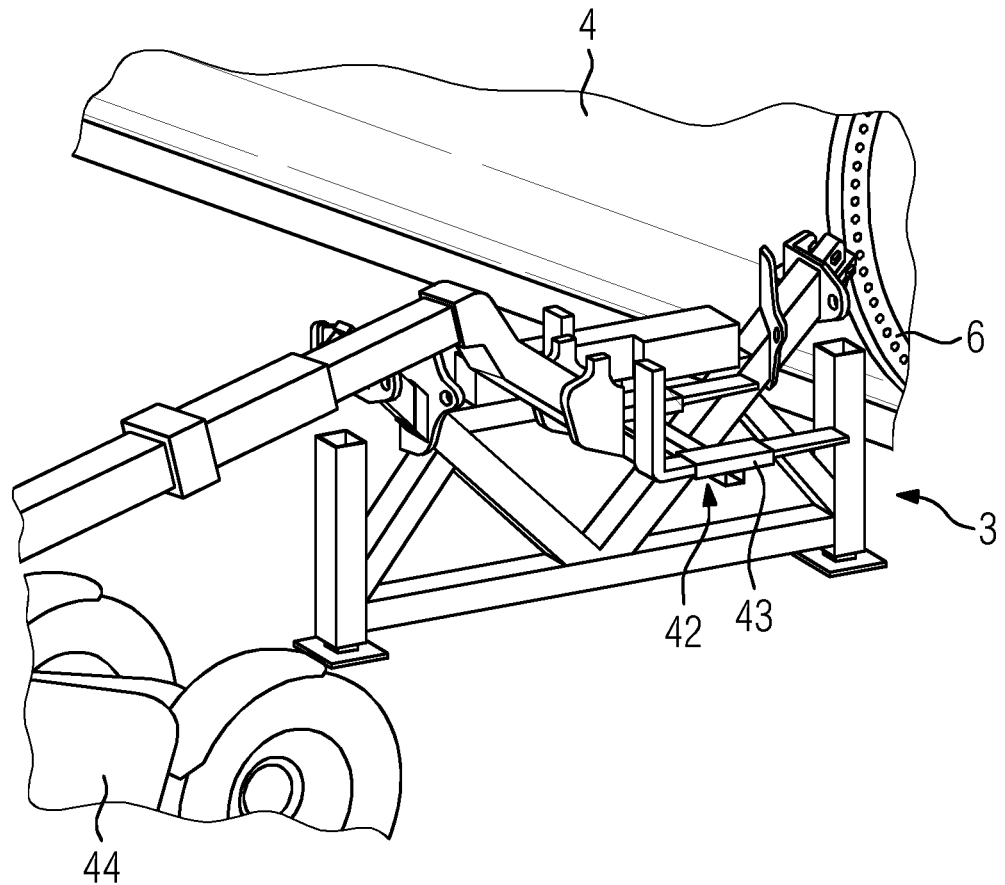
FIG. 14 shows the top tool device according to FIGS. 6-10 with a mounting means.

As shown in FIG. 14, the tool arrangement 1 further comprises transportation means 42 with two fork pockets 43. The transportation means 42 can be removably attached to the tool devices 2, 3, wherein a telescopic handler 44 can be used to lift the respective tool device 3, 4 to attach it to the tower, which is already loaded on the truck 45.

Figure 15:
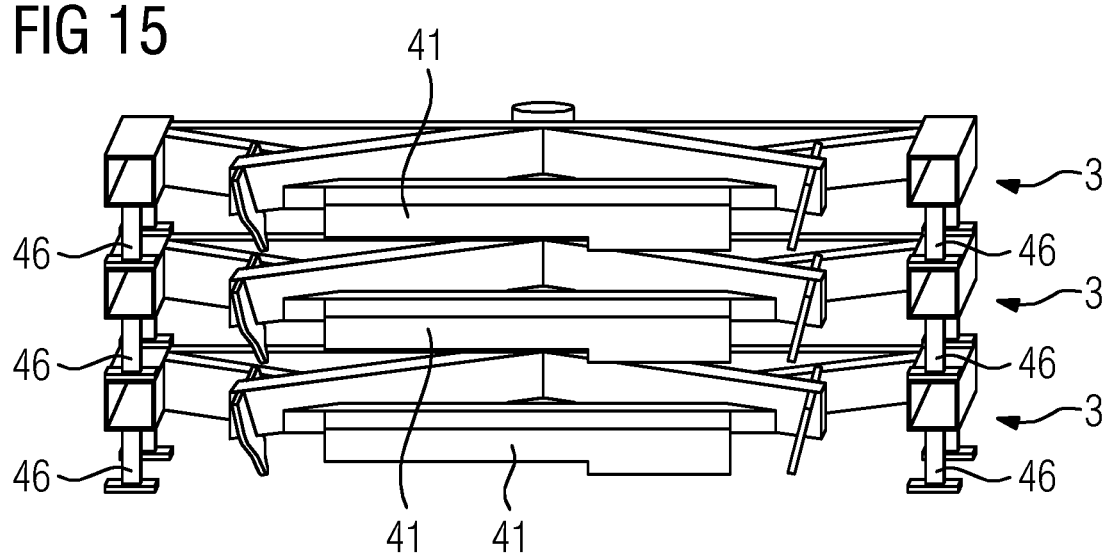
FIG. 15 shows several tool devices according to FIGS. 6-10 stacked to each other.

FIG. 15 shows three top tool devices 3 which are stacked. Each of the top tool devices 3 comprises four storing pillars 46 which are detachably attached to the vertical beams 38. The axes of the storing pillars 46 and the vertical beams 38 are rectangular to each other. The storing pillars 45 enable the top tool devices 3 to be stacked for, e.g. transportation or storing or the like. When the top tool devices 3 are stacked, each storing pillar 46 rests on a respective storing pillar support, which can be a recessed section of the adjacent top tool device 3.

Figure 16:
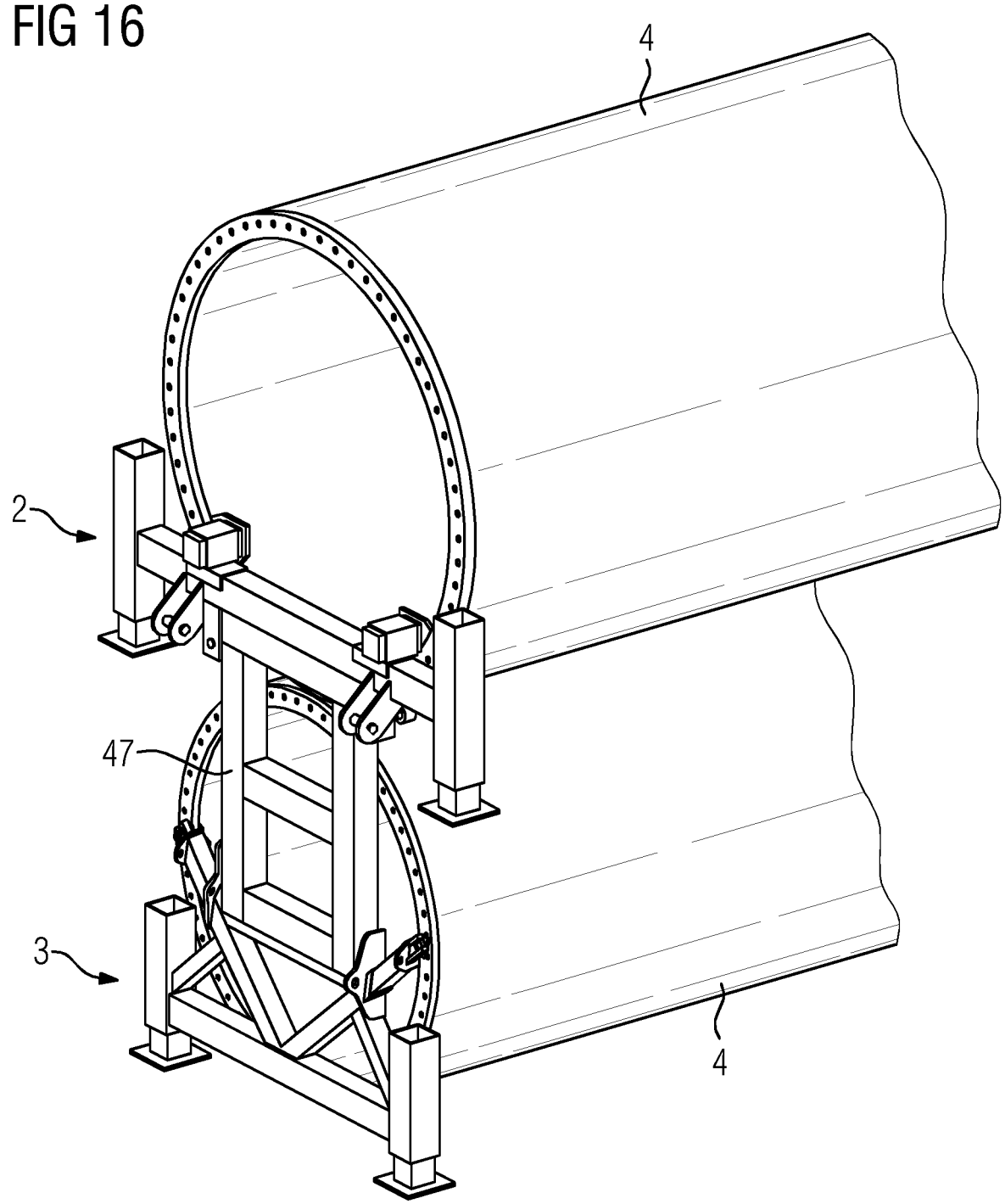
FIG. 16 shows several towers stacked up on each other and attached to several tool devices according to FIGS. 6-10.

Especially for sea transportation, several towers 4 are often stacked one upon the other in the non-erected position as shown in FIG. 16. To enable a secure stacking, the tool arrangement 1 further comprises a frame-like connecting piece 47 which is removably attachable to the bottom tool device 2 and to the top tool device 3 on opposite sides of the connecting piece 47. The tool devices 2, 3 can be attached to the connecting piece 47 by attaching means like screws, clamping devices or the like (not shown).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A tool arrangement for pivoting a tower or a tower segment from a non-erected position to an erected position, comprising:
a bottom tool device with a first device section with an attachment means to removably attach the first device section to a bottom mounting section of the tower or the tower segment, and with a second device section configured to be arranged on a ground and being attachable or attached to the first device section, wherein the bottom tool device comprises a pivot axis at least when the first device section and the second device section are attached to each other; and
a top tool device configured to be coupled to a hoisting means, comprising an attachment means to removably attach the top tool device to a top mounting section of the tower or the tower segment, wherein the top tool device comprises a first hoisting fastener and a second hoisting fastener to connect the top tool device to the hoisting means to hoist the tower or the tower segment attached to the top tool device, the attachment means of the bottom tool device and/or of the top tool device comprising a first attachment device and a second attachment device, further wherein a relative position between the first attachment device and the second attachment device is adjustable, and the first attachment device and the second attachment device are a clamping device;
wherein the tower or the tower segment, when fixed to the bottom tool device, is pivotable around the pivot axis when being erected, and, when the tower or the tower segment is fixed to the bottom tool device, the pivot axis is perpendicular to a longitudinal axis of the tower or the tower segment.

2. The tool arrangement according to claim 1, wherein an axis forming means is arranged at the first device section and the second device section, the axis forming means engaged with each other when the first device section is attached to the second device section building the pivot axis.

3. The tool arrangement according to claim 2, wherein the axis forming means comprises a rod or at least two separate pins arranged at the first device section or the second device section and a rod or pin support arranged at the second device section or the first device section, further wherein the rod or the pins engage in the rod or pin support building the pivot axis.

4. The tool arrangement according to claim 1, wherein the second device section comprises a ground plate or frame with several ground spikes protruding from the ground plate or frame for fixing the ground plate or frame to the ground.

5. The tool arrangement according to claim 1, wherein the clamping device comprises a first clamping part and a second clamping part configured to clamp the bottom mounting section or the top mounting section of the tower or the tower segment in between.

6. The tool arrangement according to claim 1, wherein the first device section of the bottom tool device and/or the top tool device is or comprises a main beam, and the first attachment device and/or the second attachment device is, along a longitudinal main beam axis, movably mounted on the main beam.

7. The tool arrangement according to claim 1, wherein that the first device section of the bottom tool device and/or the top tool device is or comprises a V-shaped beam arrangement with a first beam and a second beam, and the first attachment device is, along a longitudinal first beam axis, movably arranged on the first beam and the second attachment device is, along a longitudinal second beam axis, movably arranged on the second beam.

8. The tool arrangement according to claim 7, wherein the longitudinal first beam axis is perpendicular to the longitudinal second beam axis.

9. The tool arrangement according to claim 7, wherein:
the first beam acts as a guiding rail for the first attachment device and the second beam acts as a guiding rail for the second attachment device; or
the first beam comprises an extendable first beam bar and the second beam comprises an extendable second beam bar, wherein the respective attachment device is attached to the respective beam bar.

10. The tool device according to claim 1, wherein the first hoisting fastener and the second hoisting fastener of the top tool device are located along a connecting line defined by the first attachment device and the second attachment device.

11. The tool arrangement according to claim 1, wherein the first device section of the bottom tool device and/or the top tool device comprises a support section, and the tower or the tower segment rests on the support section if the tower or the tower segment is in the non-erected position and attached to the respective tool device.

12. The tool arrangement according to claim 1, wherein the bottom tool device and the top tool device comprise a lifting means to lift the tower or the tower segment, when the tower or the tower segment is in the non-erected position and attached to the respective tool device.

13. The tool arrangement according to claim 12, wherein each lifting means is or comprises at least two extendable pillars.

14. The tool arrangement according to claim 13, wherein the at least two extendable pillars are arranged at sides of the bottom tool device and the top tool device.

15. The tool arrangement according to claim 1, wherein the bottom tool device and/or the top tool device comprises pneumatic or hydraulic means for operating and/or positioning the attachment means and/or for operating the lifting means.

16. A tool arrangement for pivoting a tower or a tower segment from a non-erected position to an erected position, comprising:
a bottom tool device with a first device section with an attachment means to removably attach the first device section to a bottom mounting section of the tower or the tower segment, and with a second device section configured to be arranged on a ground and being attachable or attached to the first device section, wherein the bottom tool device comprises a pivot axis at least when the first device section and the second device section are attached to each other; and
a top tool device configured to be coupled to a hoisting means, comprising an attachment means to removably attach the top tool device to a top mounting section of the tower or the tower segment, wherein the top tool device comprises a first hoisting fastener and a second hoisting fastener to connect the top tool device to the hoisting means to hoist the tower or the tower segment attached to the top tool device, the attachment means of the bottom tool device and/or of the top tool device comprising a first attachment device and a second attachment device, further wherein a relative position between the first attachment device and the second attachment device is adjustable;

wherein the tower or the tower segment, when fixed to the bottom tool device, is pivotable around the pivot axis when being erected, and, when the tower or the tower segment is fixed to the bottom tool device, the pivot axis is perpendicular to a longitudinal axis of the tower or the tower segment;

wherein the first device section of the bottom tool device and/or the top tool device is or comprises a main beam, and the first attachment device and/or the second attachment device is, along a longitudinal main beam axis, movably mounted on the main beam.

* * * * *